United States Patent
Onaka et al.

(10) Patent No.: US 11,535,304 B2
(45) Date of Patent: Dec. 27, 2022

(54) FRONT VEHICLE-BODY STRUCTURE OF VEHICLE

(71) Applicant: MAZDA MOTOR CORPORATION, Hiroshima (JP)

(72) Inventors: Yasuyuki Onaka, Aki-gun (JP); Shogo Okada, Aki-gun (JP); Yutaka Mitoma, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 73 days.

(21) Appl. No.: 17/180,362

(22) Filed: Feb. 19, 2021

(65) Prior Publication Data

US 2021/0300479 A1 Sep. 30, 2021

(30) Foreign Application Priority Data

Mar. 31, 2020 (JP) .............................. JP2020-064326

(51) Int. Cl.
*B62D 25/12* (2006.01)
*B62D 25/10* (2006.01)

(52) U.S. Cl.
CPC .............. *B62D 25/12* (2013.01); *B62D 25/10* (2013.01)

(58) Field of Classification Search
CPC ....... B62D 25/10; B62D 25/105; B62D 25/12
USPC .......................... 296/187.09, 193.11, 187.03
See application file for complete search history.

(56) References Cited

U.S. PATENT DOCUMENTS

| 2014/0062142 A1* | 3/2014 | Ikeda ..................... | B62D 25/12 |
| | | | 296/193.11 |
| 2016/0083019 A1* | 3/2016 | Takada ................. | B62D 25/105 |
| | | | 296/193.11 |
| 2017/0158163 A1* | 6/2017 | Yoshida ................ | B62D 25/12 |
| 2021/0061367 A1* | 3/2021 | Hahnlen ............... | B21B 22/02 |

FOREIGN PATENT DOCUMENTS

| CN | 102695643 A | * | 9/2012 | ............. B60R 21/34 |
| CN | 207916976 U | * | 9/2018 | ......... B60R 13/0838 |
| EP | 3611237 A1 | * | 2/2020 | ........... B21D 39/021 |
| JP | 2018-008625 A | | 1/2018 | |
| KR | 20080014208 A | * | 2/2008 | ............. B60D 25/10 |

OTHER PUBLICATIONS

Machine translation for CN-207916976-U.*

* cited by examiner

*Primary Examiner* — D Glenn Dayoan
*Assistant Examiner* — Kevin P Weldon
(74) *Attorney, Agent, or Firm* — Studebaker & Brackett PC

(57) ABSTRACT

A front vehicle-body structure of a vehicle ensures good vehicle appearance and ease in operating a bonnet without increasing the vehicle body weight. The front vehicle-body structure includes a bonnet including outer and inner panels, a hinge supporting the bonnet such that the bonnet can open and close, and a damper member urging the bonnet. The inner panel includes front and rear frame portions, and a pair of side frame portions respectively connecting left and right ends of the front and rear frame portions and each including a hinge mounting portion and a damper mounting portion for mounting the damper member frontward of the hinge mounting portion. The side frame portion includes a convex first bead portion formed partially in a curved shape between the hinge mounting portion and the damper mounting por- (Continued)

tion and extending back and forth from the hinge mounting portion to the damper mounting portion.

10 Claims, 11 Drawing Sheets

25: HINGE MOUNTING PORTION
26: DAMPER MOUNTING PORTION

43: BALL JOINT PORTION

FRONT VEHICLE-BODY STRUCTURE OF VEHICLE

BACKGROUND

Technical Field

The present disclosure relates to a front vehicle-body structure of a vehicle, in particular to a front vehicle-body structure of a vehicle including a hinge that supports a bonnet such that the bonnet can open and close and a damper member that urges the bonnet from a closed position toward an open position.

Background Art

A front vehicle-body structure has been conventionally known that includes a bonnet including a bonnet outer panel (hereinafter abbreviated as an outer panel) and a bonnet inner panel (hereinafter abbreviated as an inner panel) attached to a back side of the outer panel; and a hinge supporting the bonnet such that the bonnet can open and close relative to an opening above an engine room formed in a vehicle body.

In the case of a vehicle equipped with a large bonnet, an operation of opening the bonnet is burdensome for occupants. Hence, a damper member for always urging the bonnet from a closed position toward an opening position is provided to assist the occupant in opening the bonnet.

A vehicle front structure disclosed in Japanese Patent Laid-Open No. 2018-008625 includes a bonnet composed of an outer panel and an inner panel, a hinge fixed to a cowl side panel and supporting a rear end of the bonnet such that the rear end of the bonnet can pivot around a horizontal axis, and a damper member urging the bonnet from a closed position toward an open position. In the damper member, a base portion (rear end) of a cylinder is supported by a strut tower via a bracket such that the base portion can pivot around a horizontal axis, and a distal end portion (front end) of a piston rod is supported by a mounting wall of the inner panel via a bracket such that the distal end portion can pivot around a horizontal axis.

A pair of left and right front fender panel (hereinafter each abbreviated as a front fender) constituting side walls of a vehicle body are disposed respectively at left and right ends below the bonnet. A boundary extending back and forth, or a so-called parting portion, is formed between the bonnet and each front fender.

If a gap occurs at the parting portion due to positional displacement, it not only greatly degrades appearance (how the vehicle looks) but also invites the possibility of rain water and the like entering the engine room through the gap. Thus, parting adjustment is generally made during an inspection process so that there is no large gap between the bonnet and the front fender.

SUMMARY

An inner panel typically includes front and rear frame portions extending in a vehicle width direction and a pair of side frame portions each connecting ends in the vehicle width direction of the front and rear frame portions, and these frame portions form, in combination with an outer panel, a partially closed-cross section that is annular and partially includes open sections. Additionally, for the purpose of ensuring rigidity of the bonnet, the side frame portion and the like is given a substantially U-shaped cross-sectional shape or a concave cross-sectional shape in front view that is formed of a gentle curved surface and a flat surface and extends toward an inner periphery side from an outer peripheral end thereof joined to the outer panel by hemming of the outer panel, whereby section modulus (cross-sectional area) of the partially closed-cross section is increased.

Hence, providing a damper member, which urges the bonnet from a closed position toward an opening portion, to improve the easiness in operating the bonnet may degrade the appearance of the vehicle.

Due to the side frame portion being configured as above, a hinge mounting portion for mounting a hinge is disposed on a substantially horizontal lower wall of the side frame portion in view of easy mounting while a damper mounting portion for mounting a damper member is disposed on a substantially vertical side wall of the side frame portion in view of pivotability (galling, interference, etc.) of a connecting joint.

In other words, as urging force of the damper member toward a vehicle-width-direction outer front side is applied to the damper mounting portion of the side frame portion, any deformation of the side frame portion toward the vehicle-width-direction outer front side may produce an unexpected gap at the parting portion between the bonnet and the front fender. If the hinge mounting portion and the damper mounting portion are at different positions in the vehicle width direction, the gap may increase further.

One may conceive of providing the side frame portion with an additional member for reinforcing rigidity of the side frame portion to prevent its deformation caused by the urging force of the damper member.

However, in order to ensure dimensional accuracy of the parting portion between the bonnet and the front fender, a reinforcement member, if used, is at least required to uniformly reinforce an entire area between the hinge mounting portion and the damper mounting portion, which leads to increased vehicle body weight and cost.

This means that it is not easy to ensure both good appearance of the vehicle and easiness in operating the bonnet without increasing the vehicle body weight.

Accordingly, the present disclosure provide a front vehicle-body structure of a vehicle and the like that can ensure both of good appearance of the vehicle and easiness in operating the bonnet.

A front vehicle-body structure of a vehicle of claim 1 includes: a room formed in a front portion of a vehicle body and having an opening at a top of the room; a bonnet including an outer panel and an inner panel attached to a back side of the outer panel; a hinge supporting the bonnet so as to allow the bonnet to open and close relative to a top opening formed in the vehicle body; and a damper member urging the bonnet from a closed position toward an open position, and is characterized in that the inner panel includes a front frame portion extending in a vehicle width direction, a rear frame portion extending in the vehicle width direction rearward of the front frame portion, and a pair of side frame portions each connecting ends in the vehicle width direction of the front frame portion and the rear frame portion and each including a hinge mounting portion for mounting the hinge and a damper mounting portion for mounting the damper member frontward of the hinge mounting portion, and the side frame portion is formed as a structure whose cross-sectional shape in front view is a substantially U-shaped cross-sectional shape or a concave cross-sectional shape extending toward an inner periphery side from an outer peripheral end thereof joined to the outer panel by hemming of the outer panel, and includes a convex first bead portion partially protruding downward in the vehicle width direction of the structure and extending in a front-rear direction from the hinge mounting portion to the damper mounting portion.

In this front vehicle-body structure of the vehicle, the inner panel includes the front frame portion extending in the vehicle width direction, the rear frame portion extending in the vehicle width direction rearward of the front frame portion, and the pair of side frame portions each connecting the ends in the vehicle width direction of the front frame portion and the rear frame portion and each including the hinge mounting portion for mounting the hinge and the damper mounting portion for mounting the damper member frontward of the hinge mounting portion. Thus, this front vehicle-body structure allows both of the hinge mounting portion and the damper mounting portion to be disposed on the side frame portion while forming lattice-shaped frame portions in the bonnet.

The side frame portion is formed as a structure whose cross-sectional shape in front view is a substantially U-shaped cross-sectional shape or a concave cross-sectional shape extending toward the inner periphery side from the outer peripheral end thereof joined to the outer panel by hemming of the outer panel, and the side frame portion includes the convex first bead portion that partially protrudes downward in the vehicle width direction of the structure and extends in the front-rear direction from the hinge mounting portion to the damper mounting portion. Hence, this front vehicle-body structure can provide reinforcement between the hinge mounting portion and the damper mounting portion thanks to the bead effect without the need for additional reinforcement members, and thus can restrain deformation of the side frame portion caused by the urging force of the damper member. This ensures dimensional accuracy of the parting portion between the bonnet and the front fender regardless of the urging force of the damper member.

In the above embodiments, the damper mounting portion is provided on a vehicle-width-direction outer side of a front portion of the first bead portion, and a ball joint portion for pivotably mounting the damper member is mounted on the damper mounting portion. This configuration allows for mounting the ball joint portion while maintaining pivotability of the damper member.

In the above embodiments, the side frame portion includes, on a vehicle-width-direction outer side of the first bead portion, a convex second bead portion extending in the front-rear direction and protruding downward. This configuration allows for effectively reinforcing rigidity of the side frame portion without the need for additional reinforcement members.

In the above embodiments, at least a part of the damper member is disposed between the first bead portion and the second bead portion in plan view. This configuration increases shock absorption performance by spacing the damper member and the inner panel from each other, improving pedestrian protection performance.

In the above embodiments, the side frame portion is formed to have a reduced vehicle-width-direction dimension from a rear end thereof to the damper mounting portion, and a distance between the first and second bead portions in the vehicle width direction is smaller toward a front side, and the first and second bead portions are connected at front ends thereof. By reducing the gap between the first and second bead portions in the vehicle width direction, this configuration ensures rigidity of a portion with a smaller vehicle-width-direction dimension thanks to the bead effect.

In the above embodiments, the side frame portion includes, in front of the damper mounting portion, a fragile portion whose vertical dimension is smaller than other portions. This configuration can produce remarkable rigidity difference between the fragile portion and the portions behind it, allowing for impact absorption by outward bending deformation of the fragile portion as well as preventing the bonnet from moving rearward with its original shape kept and thus contacting a windshield in the event of a collision.

In the above embodiments, the side frame portion is provided with a reinforcement member for reinforcing the damper mounting portion. This configuration produces more remarkable rigidity difference between the fragile portion and the portions behind it, by use of the reinforcement member for the damper mounting portion.

The front vehicle-body structure of the vehicle of the present disclosure can ensure both of good appearance of the vehicle and easiness in operating the bonnet by providing the bead portion extending in the front-rear direction from the hinge mounting portion to the damper mounting portion.

DETAILED DESCRIPTION

Some modes for carrying out the present disclosure will be described below with reference to the drawings. The following description of preferred embodiments is merely exemplary in nature and is in no way intended to limit the present disclosure, its application, or uses.

First Embodiment

Below a description will be given of a first embodiment of the present disclosure with reference to FIGS. 1 to 12.

Figure 1:
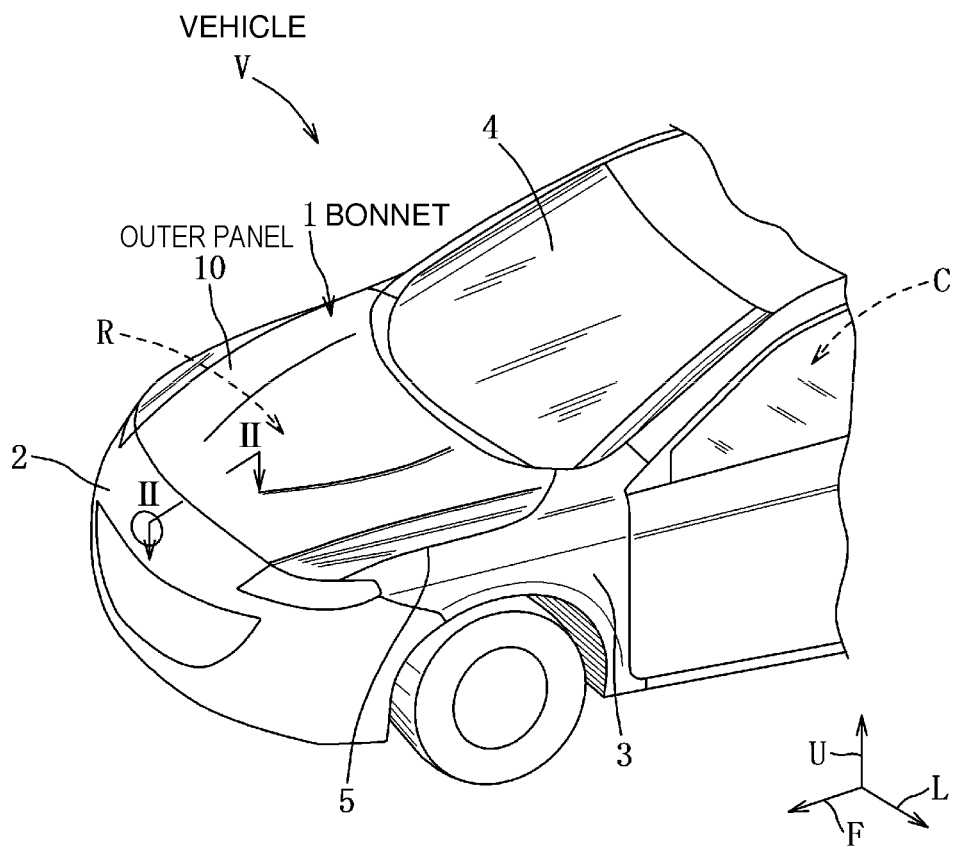
FIG. 1 is a front perspective view of a vehicle having a front vehicle-body structure according to a first embodiment.

As shown in FIG. 1, a vehicle V according to the first embodiment incudes a bonnet 1 that openably and closably covers a portion above an engine room R formed in front of a vehicle cabin C in which occupants are accommodated. The engine room R is defined by a space that is delimited by a front bumper 2 disposed at a front end of a vehicle body, a pair of left and right front fender panels (hereinafter each abbreviated as a front fender) 3 extending rearward from left and right ends, respectively, of the front bumper 2, and a dash panel (not shown) supporting a lower end of a windshield 4 and constituting a front wall of the vehicle cabin. A parting portion 5 extending back and forth is formed at a boundary between a vehicle-width-direction end of the bonnet 1 and an upper end of the front fender 3. In the drawings as referred to in the following description, an arrow F represents a frontward direction, an arrow L represents a leftward direction, and an arrow U represents an upward direction.

The bonnet 1 includes a bonnet outer panel (hereinafter abbreviated as an outer panel) 10 defining an exterior design, a bonnet inner panel (hereinafter abbreviated as an inner panel) 20 attached to a back side of the outer panel 10, a pair of left and right hinges 30 supporting the bonnet 1 such that the bonnet 1 can open and close relative to a top opening of the engine room R, and a pair of left and right damper members 40 urging the bonnet 1 from a closed position toward an open position. As the bonnet 1 has a symmetrical structure, the below description will focus on a structure on the left side.

The outer panel 10 will be described.

Figure 2:
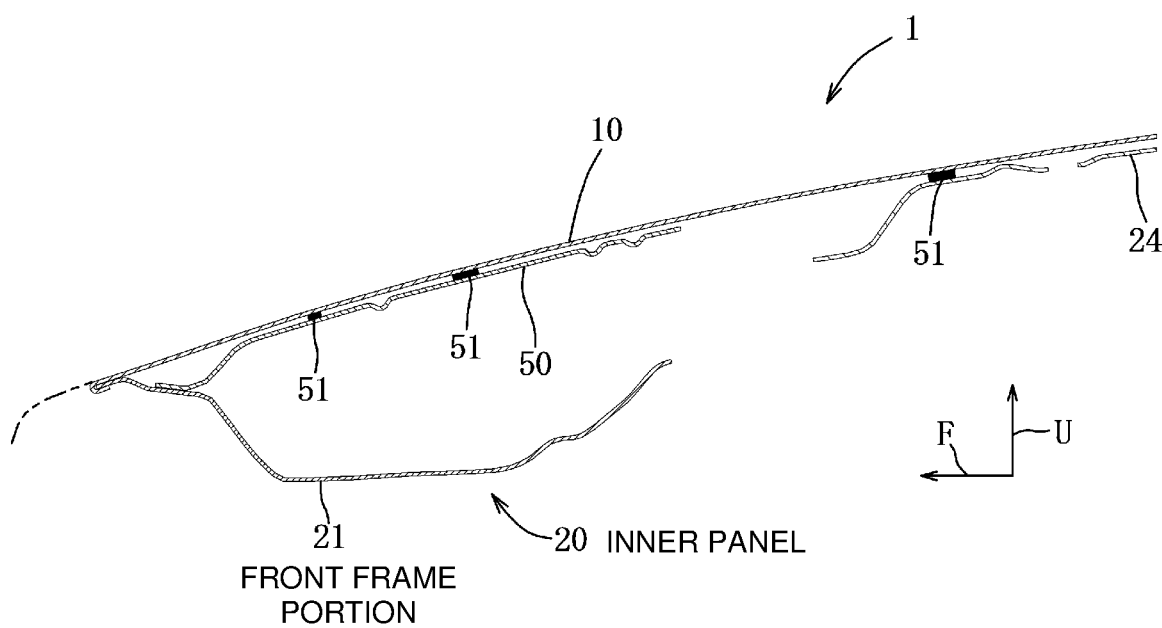
FIG. 2 is a sectional view taken along a line II-II in FIG. 1.
Figure 12:
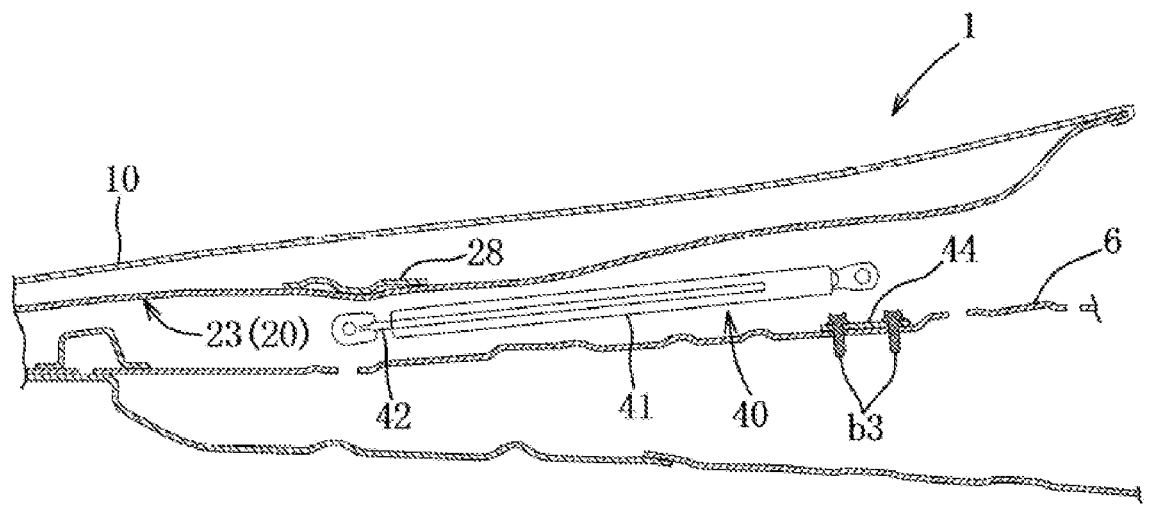
FIG. 12 is a sectional view taken along a line XII-XII in FIG. 5.
Figure 12:
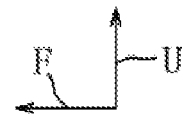

For example, the outer panel 10 is formed by pressing a steel plate material of about 0.65 mm into a substantially curved cross-sectional shape protruding upward. As shown in FIGS. 2 and 12, the outer panel 10 is disposed to face the inner panel 20 and is joined to the inner panel 20 by hemming of the outer panel 10 such that an outer peripheral edge of the outer panel 10 is folded over an outer peripheral edge of the inner panel 20.

The inner panel 20 will be described.

Figure 3:
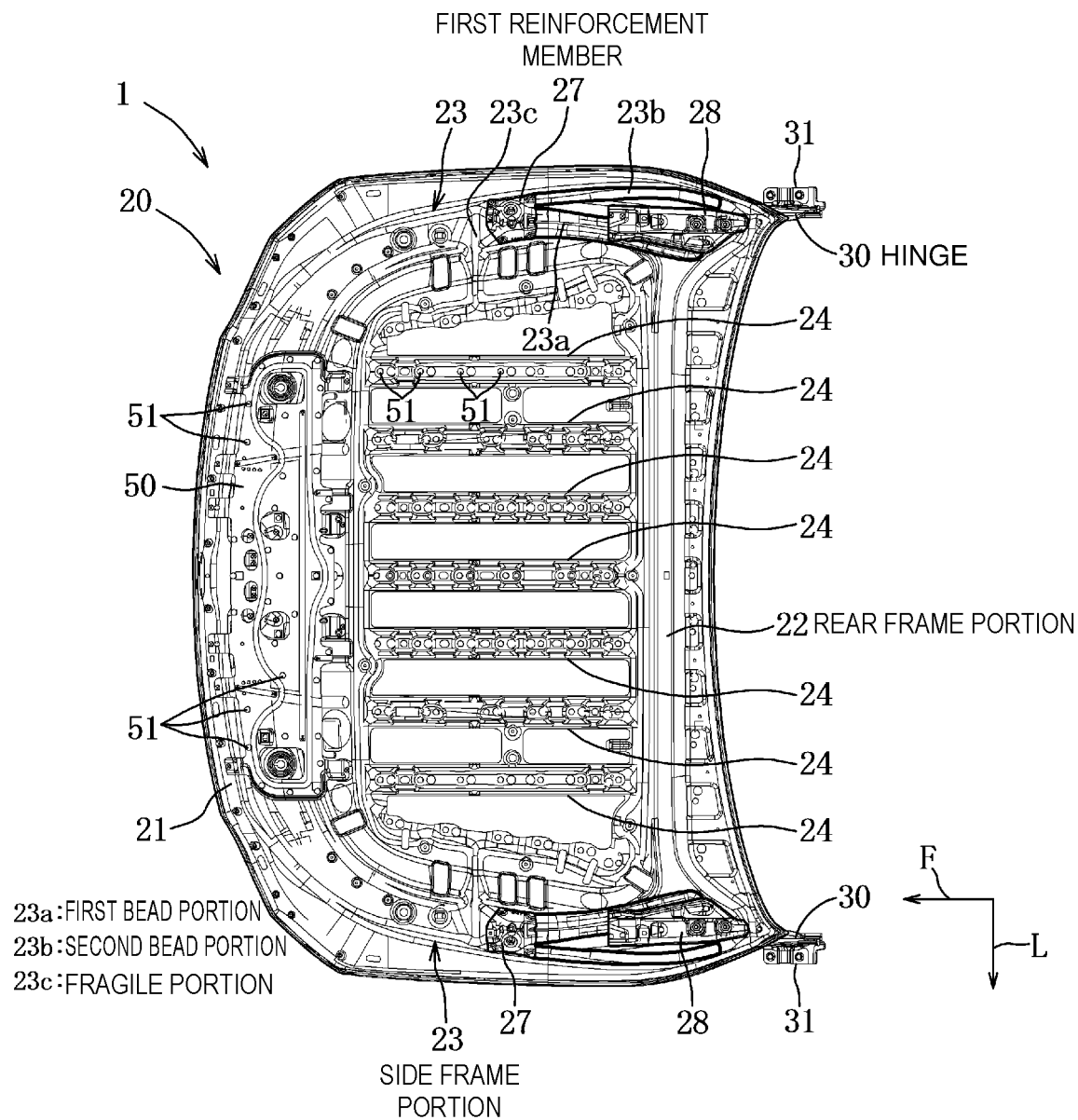
FIG. 3 is a top plan view of a bonnet with an outer panel omitted.
Figure 4:
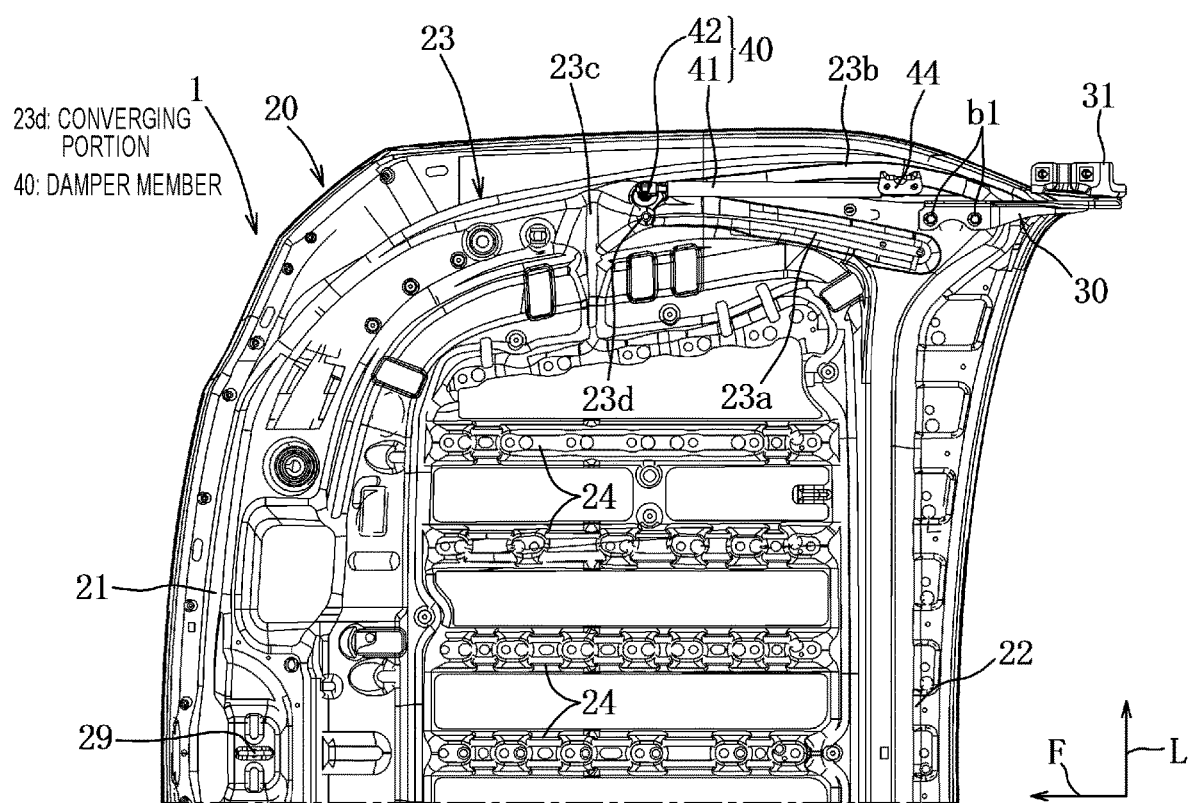
FIG. 4 is a bottom plan view of a left portion of the bonnet.

For example, the inner panel 20 is formed by pressing a steel plate material of about 0.50 mm. As shown in FIGS. 3 and 4, the inner panel 20 integrally includes a front frame portion 21 extending left and right correspondingly to a front end of the outer panel 10, a rear frame portion 22 extending left and right correspondingly to a rear end of the outer panel 10, a pair of left and right side frame portions 23 extending back and forth so as to connect left ends and right ends, respectively, of the front frame portion 21 and the rear frame portion 22, and seven inner frame portions 24 extending back and forth between the pair of side frame portions 23 so as to connect the front frame portion 21 and the rear frame portion 22. The front frame portion 21, the rear frame portion 22, and the pair of side frame portions 23 form, in combination with the outer panel 10, a partially closed-cross section that is annularly continuous and partially includes open sections.

As shown in FIG. 2, the front frame portion 21 is formed to bulge downward.

As shown in FIGS. 3 and 4, the front frame portion 21 is provided at its vehicle-width-direction center portion with a striker 29 and a stiffener 50. The substantially U-shaped striker 29 is configured to engage a latch (not shown) provided to the vehicle body and is formed to protrude downward from the front frame portion 21. The stiffener 50 is a member for adding panel rigidity to the front end portion of the outer panel 10.

For example, the stiffener 50 is formed by pressing a substantially rectangular steel plate material of about 0.50 mm. The stiffener 50 includes multiple legs extended from front and rear ends thereof, and these legs are joined by welding to a top face of the front frame portion 21.

As shown in FIGS. 2 and 3, multiple cylindrical sealers 51 are disposed on a top face of the stiffener 50. Each sealer 51 is an adhesive made from thermosetting epoxy synthetic resin, e.g., a mastic sealer, and is filled in a mating surface between the outer panel 10 and the stiffener 30. When a downward load is applied to the outer panel 10, the load is transmitted to the front frame portion 21 (inner panel 20) via the multiple sealers 51 and the stiffener 50.

The rear frame portion 22 is formed to protrude downward. Provided at a vehicle-width-direction intermediate portion of the rear frame portion 22 are the seven inner frame portions 24 connecting to the front frame portion 21. Each of the inner frame portions 24 is extended linearly in a front-rear direction and has a generally hat-shaped cross-section. Multiple sealers 51 are filled in a mating surface between each inner frame portion 24 and the outer panel 10.

As shown in FIGS. 3 to 7 and 9 to 11, the side frame portion 23 bulges downward while extending from a portion thereof hemmed in by the outer panel 10 toward an inner periphery side. Specifically, the side frame portion 23 is formed to have a substantially U-shaped cross-sectional shape in front view and extended rearward from the left end of the front frame portion 21 (end in the vehicle width direction) to the left end of the rear frame portion 22. The side frame portion 23 includes a first bead portion 23a having a curved convex cross-sectional shape and extending back and forth, a second bead portion 23b having a curved convex cross-sectional shape and extending back and forth on the left side (vehicle-width-direction outer side) of the first bead portion 23a, and a fragile portion 23c formed at an intermediate portion of the side frame portion 23 in the front-rear direction.

As shown in FIGS. 4 to 7, the first and second bead portions 23a, 23b are respectively disposed on a vehicle-width-direction inner side end portion and a vehicle-width-direction outer side end portion of the side frame portion 23 in a rear-half portion thereof. The first bead portion 23a is recessed downward over an area from a position near a connecting point of the rear frame portion 22 and the side frame portion 23 to a position near a rear side of the fragile portion 23c.

Similarly to the first bead portion 23a, the second bead portion 23b is recessed downward over an area from a position near the connecting point of the rear frame portion 22 and the side frame portion 23 to the position near the rear side of the fragile portion 23c. The second bead portion 23b includes a front end portion that constitutes a converging portion 23d by converging with a front end portion of the first bead portion 23a, and is disposed such that a distance between the second bead portion 23b and the first bead portion 23a in the vehicle width direction is larger on the rear side thereof than on the front side thereof. In other words, the rear-half portion of the rear frame portion 22 is formed to have a vehicle-width-direction dimension that is smaller toward the front side and to have a curved cross-sectional shape.

Figure 6:
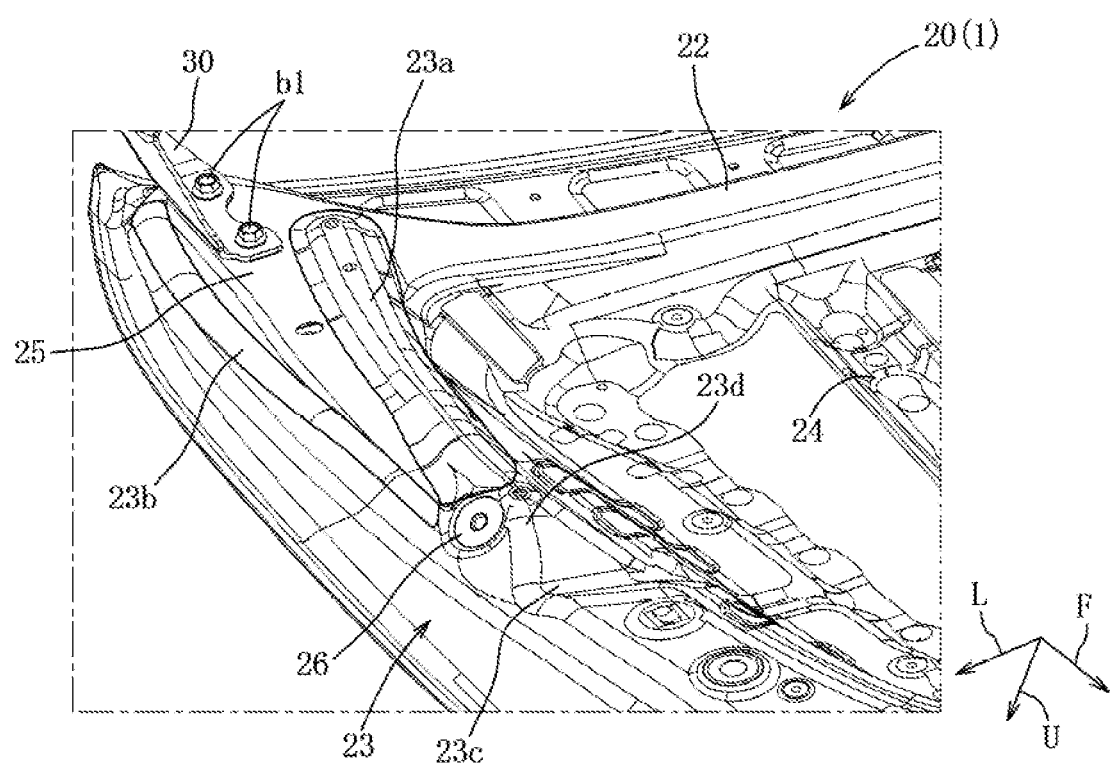
FIG. 6 is a perspective view of a region around first and second bead portions as viewed from the front left side.
Figure 7:
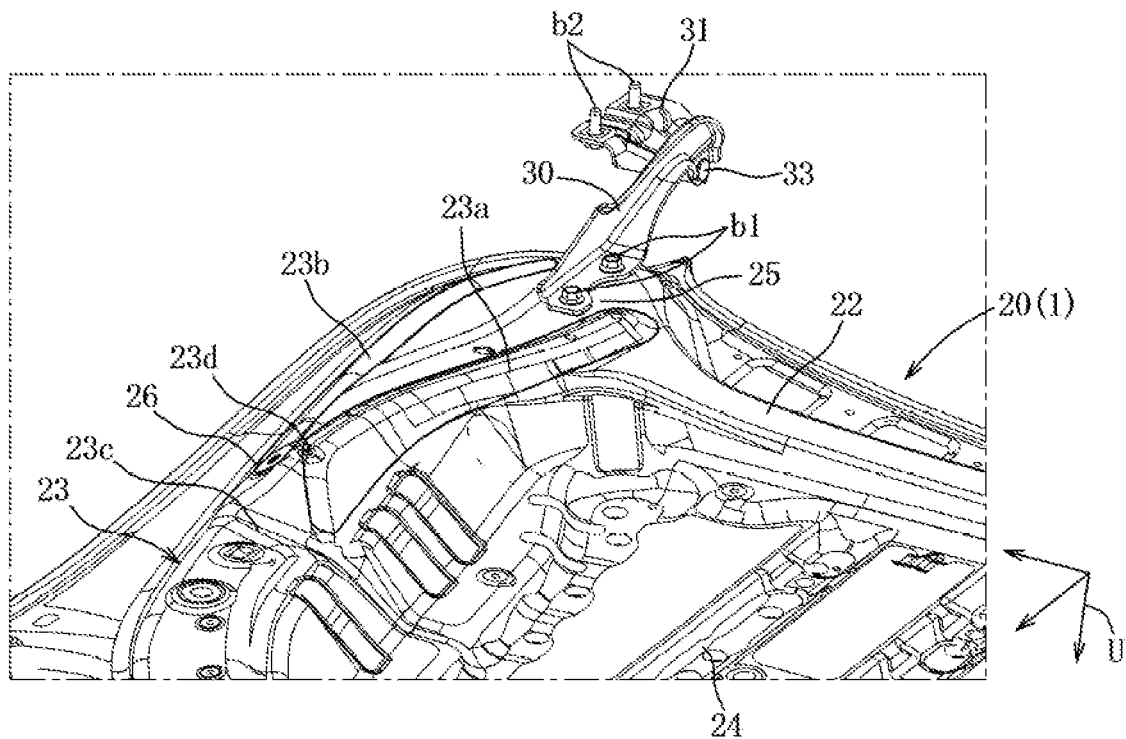
FIG. 7 is a perspective view of a region around the first and second bead portions as viewed from the front right side.

The fragile portion 23c is formed to have a lower rigidity than regions in front of and behind the fragile portion 23c in order to absorb an impact load in the event of a vehicle front-end collision. Specifically, as shown in FIGS. 6 and 7, a wedge-shaped recessed portion extending left and right is formed in the side frame portion 23 as the fragile portion 23c, and, in a height direction of a closed cross-section formed by the outer panel 10 and the side frame portion 23, a vertical dimension of the fragile portion 23c is set smaller than vertical dimensions of the regions in front of and behind the fragile portion 23c.

As shown in FIGS. 3 to 7, a converging portion 23d where the front ends of the first and second bead portions 23a, 23b converge is formed near the rear side of the fragile portion 23c.

Figure 8:
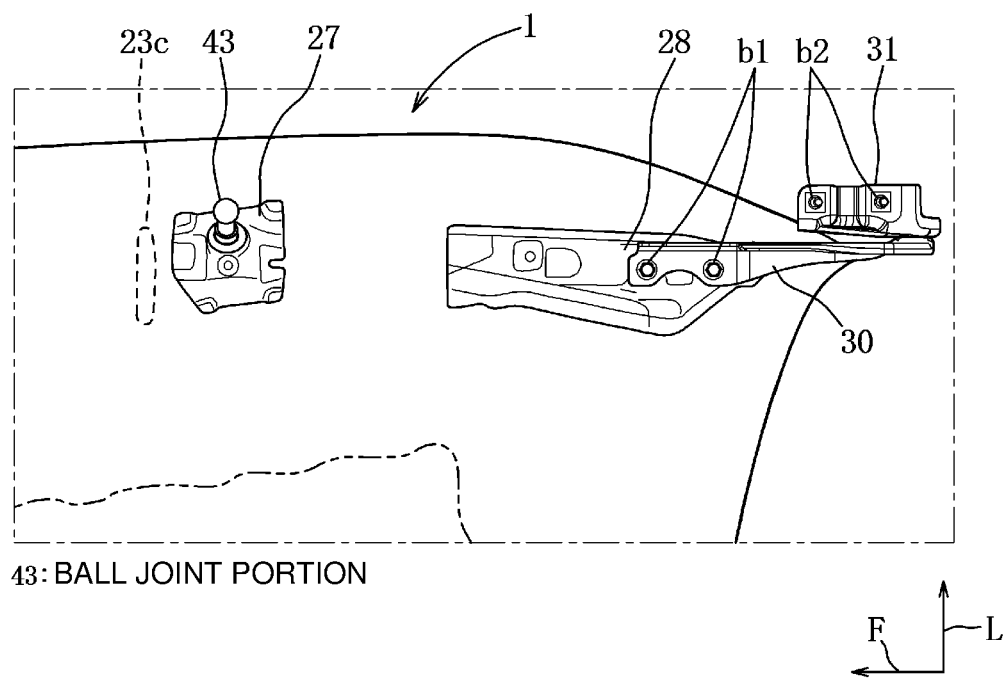
FIG. 8 corresponds to FIG. 5 with an inner panel and a damper member omitted therefrom.
Figure 11:
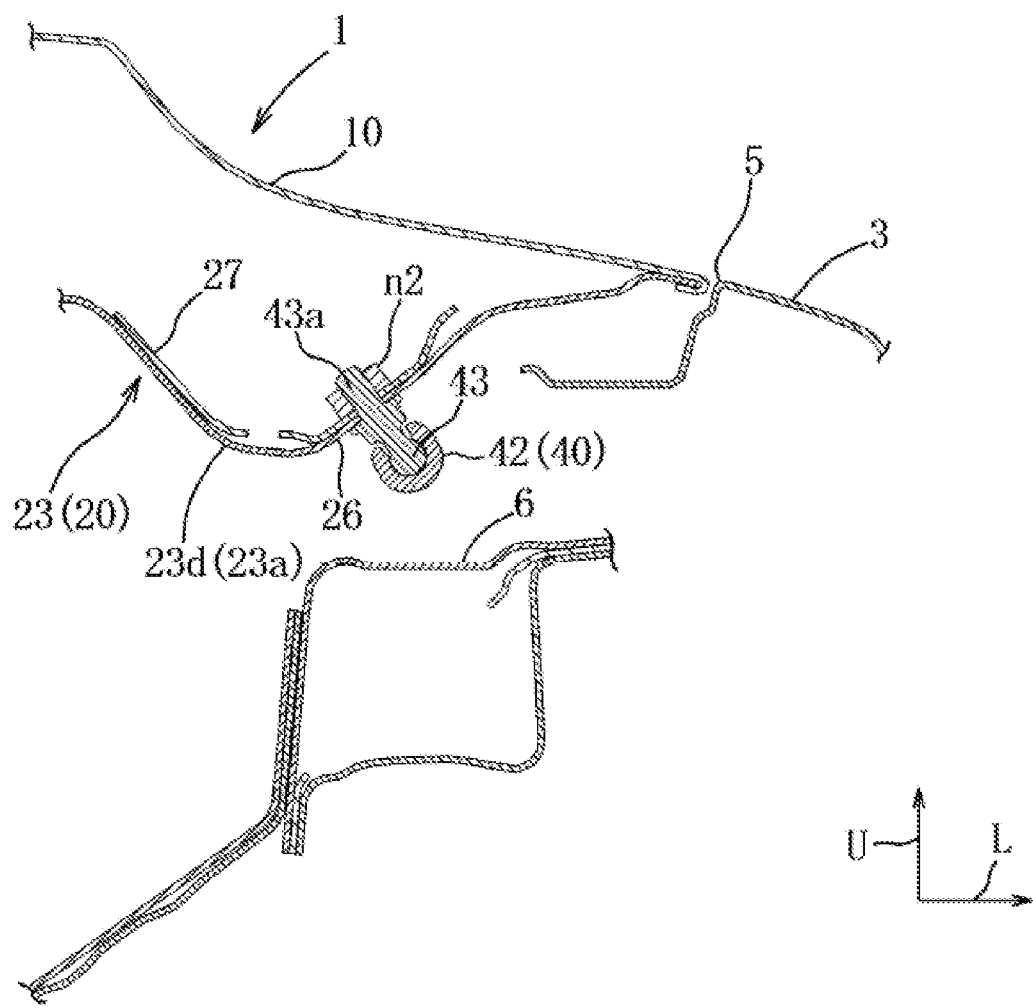
FIG. 11 is a sectional view taken along a line XI-XI in FIG. 5.

As shown in FIGS. 3, 8, and 11, a first reinforcement member 27 of a plate shape contoured to the shape of the converging portion 23d is disposed above a top face of the converging portion 23d. This allows the bonnet 1 to undergo outward bending deformation around the fragile portion 23c in the event of a vehicle front-end collision and thus absorb a collision energy, making it possible to reduce a load transmitted to the vehicle cabin and prevent the bonnet 1 from moving rearward with its original shape kept and thus contacting the windshield 4. In the present embodiment, each of the inner frame portions 24 is formed with a wedge-shaped fragile portion at a position in the front-rear direction corresponding to the fragile portion 23c.

Now the hinge 30 will be described.

Figure 5:
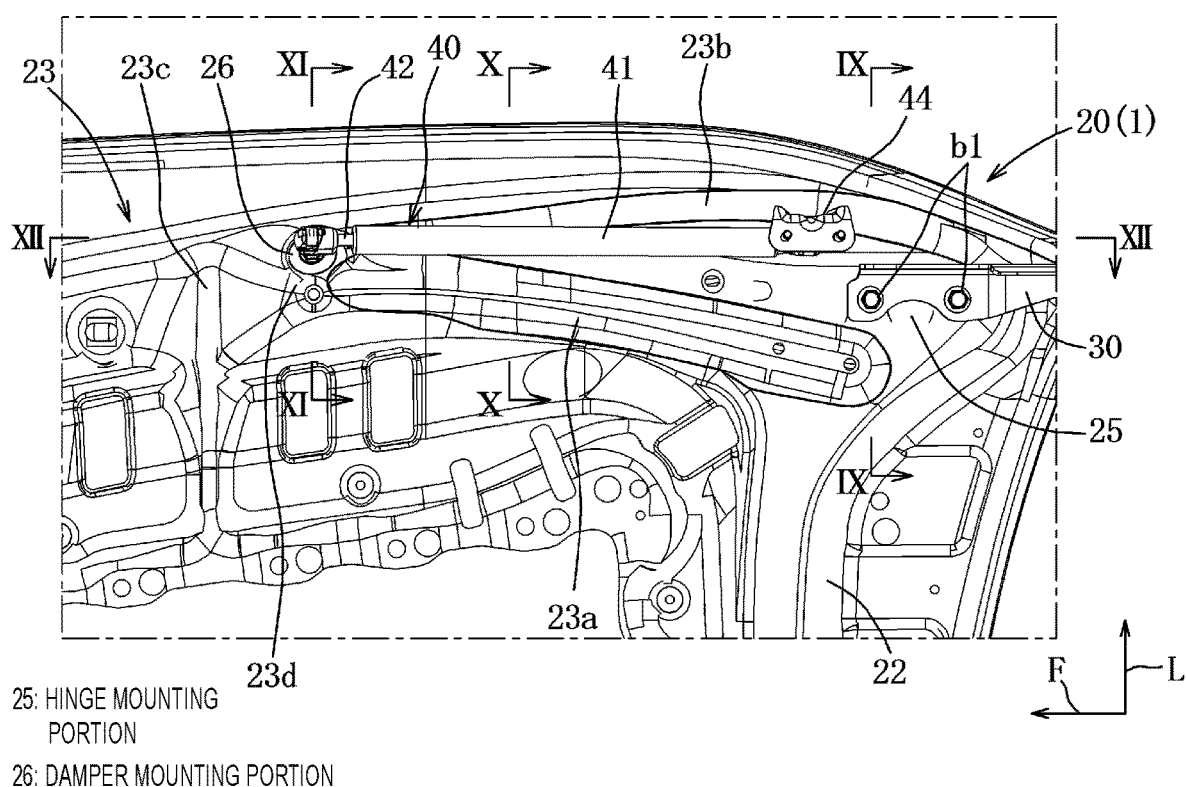
FIG. 5 is an enlarged view of major parts in FIG. 4.
Figure 9:
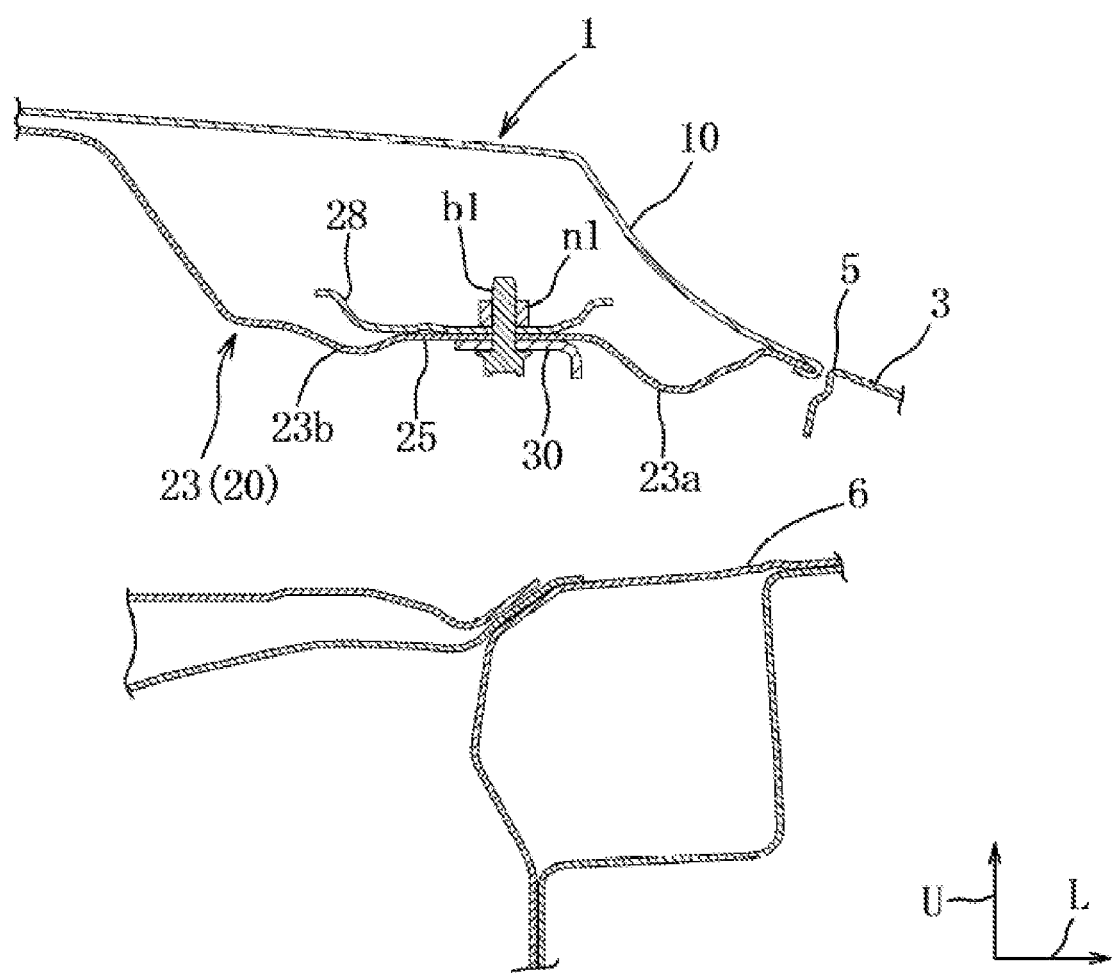
FIG. 9 is a sectional view taken along a line IX-IX in FIG. 5.
Figure 10:
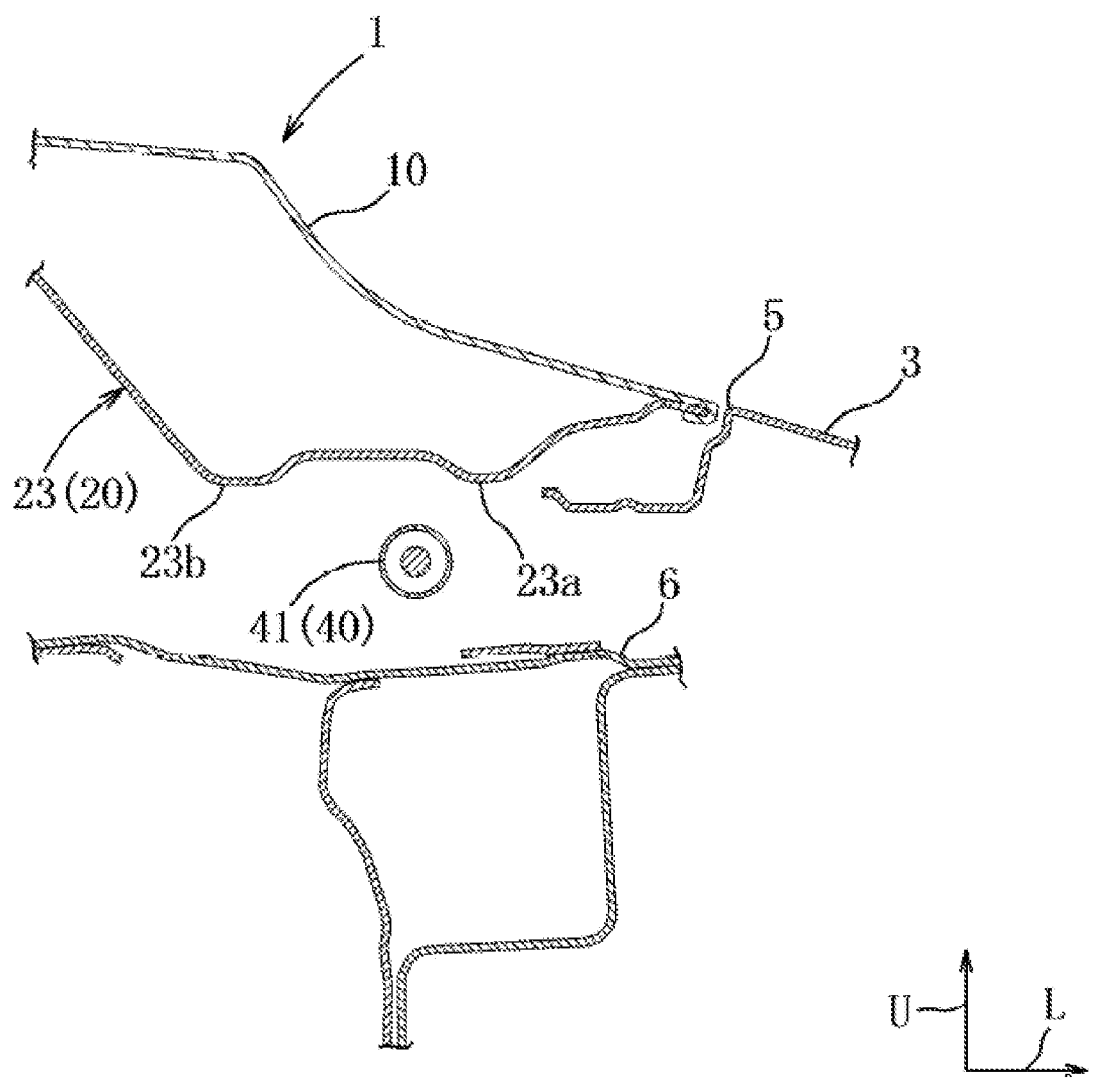
FIG. 10 is a sectional view taken along a line X-X in FIG. 5.

The hinge 30 is disposed at a rear end portion of the side frame portion 23. As shown in FIGS. 5 to 7, the hinge 30 of a substantially L-shaped cross-sectional shape is fixed with a pair of front and rear bolts b1 to a flat hinge mounting portion 25 formed between the first and second bead portions 23a, 23b of the side frame portion 23. As shown in FIG. 9, a plated-shaped second reinforcement member 28 extending back and forth is disposed on a top face of the hinge mounting portion 25. A nut n1 that can be tightened to the bolt b1 is joined in advance to a top face of the second reinforcement member 28.

A hinge bracket 31 made of metal is fastened and fixed with a pair of front and rear bolts b2 to an upper end of a vehicle body-side member, e.g., a suspension tower (not shown). As shown in FIG. 7, the hinge 30 is disposed on a vehicle-width-direction inner side of the hinge bracket 31 and is supported so as to be pivotable around a shaft 33 that is supported by the hinge bracket 31 and extends in the vehicle width direction.

The damper member 40 will be described.

In plan view, the damper member 40 is disposed in front of and on the vehicle-width-direction outer side of the hinge 30 and is disposed between the first and second bead portions 23a, 23b except its front end portion. Main components of the damper member 40 include a closed-end cylindrical cylinder 41 and a piston rod 42 that can advance and retreat in an axial direction with a part thereof inserted in the cylinder 41. The damper member 40 is a gas spring damper that utilizes reaction force of gas enclosed in the cylinder 41 to always urge the piston rod 42 in an extending direction, or a so-called opening operation direction of the bonnet 1.

A rear end of the cylinder 41, which is a base end thereof, is supported by the vehicle body via a damper bracket 44. As shown in FIG. 12, the damper bracket 44 made of metal is fastened and fixed with a pair of front and rear bolts b3 to an upper end of an apron member (apron reinforcement) 6 that forms a closed cross-section extending back and forth. The rear end of the cylinder 41 is supported so as to be pivotable around a shaft (not shown) that is supported by the damper bracket 44 and extends in the vehicle width direction.

As shown in FIG. 11, a front end of the piston rod 42 is pivotably connected to the side frame portion 23 via a ball joint portion 43. The ball joint portion 43 is fastened and fixed, at an inclination angle of about 45° with respect to the up-down direction, to a damper mounting portion 26 that is formed on a left side wall (vehicle-width-direction outer side wall) of the converging portion 23d where the front ends of the first and second bead portions 23a, 23b converge. At the damper mounting portion 26, a nut n2 that can be tightened to a bolt portion 43a of the ball joint portion 43 is joined in advance to a top face of the first reinforcement member 27 placed at the converging portion 23d.

Now a description will be given of functions and effects of the front vehicle-body structure of the vehicle V.

In this front vehicle-body structure, the inner panel 20 includes the front frame portion 21 extending in the vehicle width direction, the rear frame portion 22 extending in the vehicle width direction rearward of the front frame portion 21, and the pair of side frame portions 23 each connecting the ends in the vehicle width direction of the front frame portion 21 and the rear frame portion 22 and including the hinge mounting portion 25 for mounting the hinge 30 and the damper mounting portion 26 for mounting the damper member 40 frontward of the hinge mounting portion 25. Thus, this front vehicle-body structure allows both of the hinge mounting portion 25 and the damper mounting portion 26 to be disposed on the side frame portion 23 while forming lattice-shaped frame portions in the bonnet 1. The side frame portion 23 is formed to as a structure of a substantially U-shaped cross-sectional shape that extends, in front view, from an outer peripheral end thereof joined to the outer panel 10 by hemming of the outer panel 10 toward the inner periphery side, and the side frame portion 23 includes the convex first bead portion 23a that partially protrudes downward in the vehicle width direction of the structure, formed partially in a curved shape between the hinge mounting portion 25 and the damper mounting portion 26, and extends in the front-rear direction from the hinge mounting portion 25 to the damper mounting portion 26. Hence, this front vehicle-body structure can provide reinforcement between the hinge mounting portion 25 and the damper mounting portion 26 thanks to the bead effect without the need for additional reinforcement members, and thus can restrain deformation of the side frame portion 23 caused by the urging force of the damper member 40. This ensures dimensional accuracy of the parting portion 5 between the bonnet 1 and the front fender 3 regardless of the urging force of the damper member 40.

The damper mounting portion 26 is provided on the vehicle-width-direction outer side of the front portion (converging portion 23d) of the first bead portion 23a, and the ball joint portion 43 for pivotably mounting the damper member 40 is mounted on the damper mounting portion 26. This allows for mounting the ball joint portion 43 while maintaining pivotability of the damper member 40.

The side frame portion 43 includes, on the vehicle-width-direction outer side of the first bead portion 23a, the convex second bead portion 23b extending in the front-rear direction and protruding downward. This allows for effectively reinforcing the rigidity of the side frame portion 23 without the need for additional reinforcement members.

At least a part of the damper member 40 is disposed between the first bead portion 23a and the second bead portion 23b in plan view. This increases shock absorption performance by spacing the damper member 40 and the inner panel 20 from each other, improving pedestrian protection performance.

The side frame portion 23 is formed to have a reduced vehicle-width-direction dimension from its rear end to the damper mounting portion 26, and a distance in the vehicle width direction between the first and second bead portions 23a, 23b is smaller toward the front side while the first and second bead portions 23a, 23b are connected at their front ends. Reducing the gap between the first and second bead portions 23a, 23b in the vehicle width direction ensures rigidity of a portion with a smaller vehicle-width-direction dimension thanks to the bead effect.

The side frame portion 23 includes, in front of the damper mounting portion 26, the fragile portion 23c with a smaller vertical dimension than other portions. This produces remarkable rigidity difference between the fragile portion 23c and the portions behind it, allowing for impact absorption by outward bending deformation of the fragile portion 23c as well as preventing the bonnet 1 from moving rearward with its original shape kept and thus contacting the windshield 4 in the event of a collision.

The side frame portion 23 is provided with the first reinforcement member 27 for reinforcing the damper mounting portion 26. This produces more remarkable rigidity difference between the fragile portion 23c and the portions behind it, by use of the reinforcement member for the damper mounting portion 26.

Below a description will be given of partial modifications to the above embodiment.

1) While the above embodiment has described the case of forming the first and second bead portions 23a, 23b on the side frame portion 23, at least providing the first bead portion 23a extending in the front-rear direction from the hinge mounting portion 25 to the damper mounting portion 26 can provide the advantageous effects of the present disclosure. Hence, in the case where the fragile portion 23c is omitted, the first bead portion 23a may be extended to a front-half portion of the side frame portion 23 beyond the rear-half portion thereof.

2) While the above embodiment has described the case where the bonnet 1 has a symmetrical structure and the pair of damper members 40 are disposed on the left and right sides, the damper member 40 may be disposed only on one of the left and right side frame portions 23 if urging force of the damper member 40 is sufficient for opening operation of the bonnet 1.

3) While the above embodiment has described the case of the gas spring damper member 40 utilizing gas pressure, the damper member 40 is at least required to generate urging force in the opening operation direction to assist in the operation of opening the bonnet 1. Thus, the damper member may be of any kind and may be a coil spring damper or a hydraulic damper.

4) While the above embodiment has described the case where the side frame portion 23 is formed to have a substantially U-shaped cross-sectional shape in front view, the side frame portion 23 is at least required to ensure the bonnet rigidity and thus may be a structure with a concave cross-sectional shape in front view.

5) In addition, it will be understood by those skilled in the art that various changes and modifications can be made to the above embodiment and also various combinations of embodiments are possible without departing from the scope of the present disclosure. The present disclosure encompasses such modified embodiments.

What is claimed is:

1. A front vehicle-body structure of a vehicle comprising:
   a space formed in a front portion of a vehicle body and having an opening at a top of the space;
   a bonnet including an outer panel and an inner panel attached to a back side of the outer panel;
   a hinge supporting the bonnet so as to allow the bonnet to open and close relative to a top opening formed in the vehicle body; and
   a damper member urging the bonnet from a closed position toward an open position,
   the inner panel including a front frame portion extending in a vehicle width direction, a rear frame portion extending in the vehicle width direction rearward of the front frame portion, and a pair of side frame portions each connecting ends in the vehicle width direction of the front frame portion and the rear frame portion and each including a hinge mounting portion for mounting the hinge and a damper mounting portion for mounting the damper member frontward of the hinge mounting portion, and
   the side frame portion being formed as a structure whose cross-sectional shape in front view is a substantially U-shaped cross-sectional shape or a concave cross-sectional shape extending toward an inner periphery side from an outer peripheral end thereof joined to the outer panel by hemming of the outer panel, and including a convex first bead portion partially protruding downward in the vehicle width direction of the structure and extending in a front-rear direction from the hinge mounting portion to the damper mounting portion; wherein
   the damper mounting portion is provided on a vehicle-width-direction outer side of a front portion of the first bead portion,
   a ball joint portion for pivotably mounting the damper member is mounted on the damper mounting portion,
   the side frame portion includes, on a vehicle-width-direction outer side of the first bead portion, a convex second bead portion extending in the front-rear direction and protruding downward, and
   at least a part of the damper member is disposed between the first bead portion and the second bead portion in plan view.

2. The front vehicle-body structure of the vehicle according to claim 1, wherein
   the side frame portion is formed to have a reduced vehicle-width-direction dimension from a rear end thereof to the damper mounting portion, and
   a distance between the first and second bead portions in the vehicle width direction is smaller toward a front side, and the first and second bead portions are connected at front ends thereof.

3. The front vehicle-body structure of the vehicle according to claim 2, wherein
   the side frame portion includes, in front of the damper mounting portion, a fragile portion whose vertical dimension is smaller than other portions.

4. The front vehicle-body structure of the vehicle according to claim 3, wherein
   the side frame portion is provided with a reinforcement member for reinforcing the damper mounting portion.

5. The front vehicle-body structure of the vehicle according to claim 1, wherein
   the side frame portion includes, in front of the damper mounting portion, a fragile portion whose vertical dimension is smaller than other portions.

6. The front vehicle-body structure of the vehicle according to claim 1, wherein
   the side frame portion is provided with a reinforcement member for reinforcing the damper mounting portion.

7. A front vehicle-body structure of a vehicle comprising:
   a space formed in a front portion of a vehicle body and having an opening at a top of the space;
   a bonnet including an outer panel and an inner panel attached to a back side of the outer panel;

a hinge supporting the bonnet so as to allow the bonnet to open and close relative to a top opening formed in the vehicle body; and a damper member urging the bonnet from a closed position toward an open position, the inner panel including a front frame portion extending in a vehicle width direction, a rear frame portion extending in the vehicle width direction rearward of the front frame portion, and a pair of side frame portions each connecting ends in the vehicle width direction of the front frame portion and the rear frame portion and each including a hinge mounting portion for mounting the hinge and a damper mounting portion for mounting the damper member frontward of the hinge mounting portion, and the side frame portion being formed as a structure whose cross-sectional shape in front view is a substantially U-shaped cross-sectional shape or a concave cross-sectional shape extending toward an inner periphery side from an outer peripheral end thereof joined to the outer panel by hemming of the outer panel, and including a convex first bead portion partially protruding downward in the vehicle width direction of the structure and extending in a front-rear direction from the hinge mounting portion to the damper mounting portion; wherein the damper mounting portion is provided on a vehicle-width-direction outer side of a front portion of the first bead portion, a ball joint portion for pivotably mounting the damper member is mounted on the damper mounting portion, the side frame portion includes, on a vehicle-width-direction outer side of the first bead portion, a convex second bead portion extending in the front-rear direction and protruding downward, the side frame portion is formed to have a reduced vehicle-width-direction dimension from a rear end thereof to the damper mounting portion, and a distance between the first and second bead portions in the vehicle width direction is smaller toward a front side, and the first and second bead portions are connected at front ends thereof.

8. A front vehicle-body structure of a vehicle comprising:
a space formed in a front portion of a vehicle body and having an opening at a top of the space;
a bonnet including an outer panel and an inner panel attached to a back side of the outer panel;
a hinge supporting the bonnet so as to allow the bonnet to open and close relative to a top opening formed in the vehicle body; and
a damper member urging the bonnet from a closed position toward an open position,
the inner panel including a front frame portion extending in a vehicle width direction, a rear frame portion extending in the vehicle width direction rearward of the front frame portion, and a pair of side frame portions each connecting ends in the vehicle width direction of the front frame portion and the rear frame portion and each including a hinge mounting portion for mounting the hinge and a damper mounting portion for mounting the damper member frontward of the hinge mounting portion, and
the side frame portion being formed as a structure whose cross-sectional shape in front view is a substantially U-shaped cross-sectional shape or a concave cross-sectional shape extending toward an inner periphery side from an outer peripheral end thereof joined to the outer panel by hemming of the outer panel, and including a convex first bead portion partially protruding downward in the vehicle width direction of the structure and extending in a front-rear direction from the hinge mounting portion to the damper mounting portion; wherein
the side frame portion includes, on a vehicle-width-direction outer side of the first bead portion, a convex second bead portion extending in the front-rear direction and protruding downward,
the side frame portion is formed to have a reduced vehicle-width-direction dimension from a rear end thereof to the damper mounting portion, and
a distance between the first and second bead portions in the vehicle width direction is smaller toward a front side, and the first and second bead portions are connected at front ends thereof.

9. The front vehicle-body structure of the vehicle according to claim 5, wherein
the side frame portion is provided with a reinforcement member for reinforcing the damper mounting portion.

10. The front vehicle-body structure of the vehicle according to claim 7, wherein
the side frame portion includes, in front of the damper mounting portion, a fragile portion whose vertical dimension is smaller than other portions.

* * * * *